Dec. 15, 1925.
C. I. LOTT
1,565,662
ROLLER BEARING
Original Filed Oct. 7, 1920
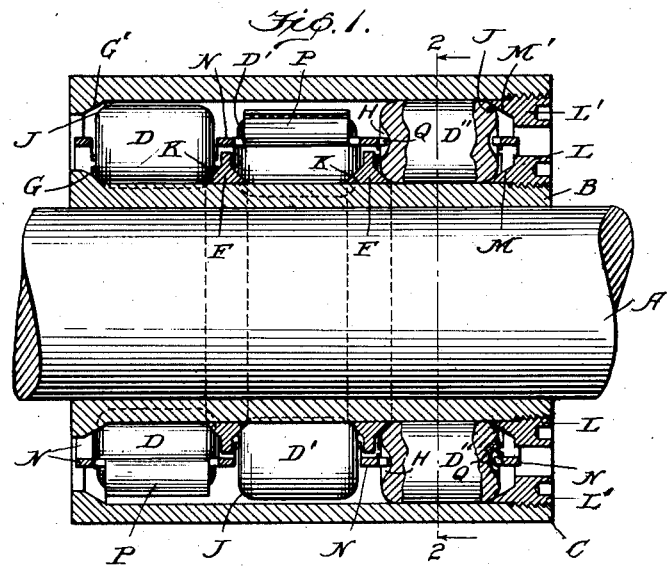
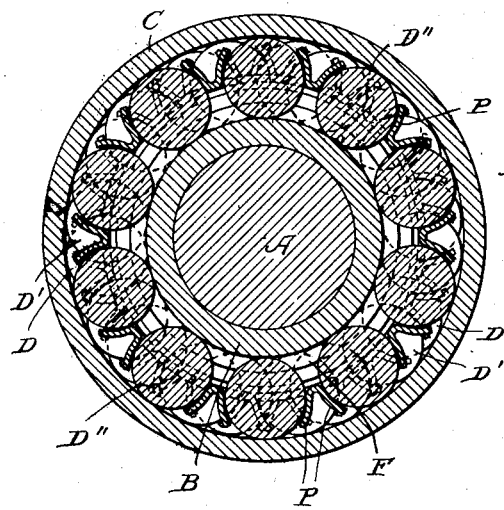
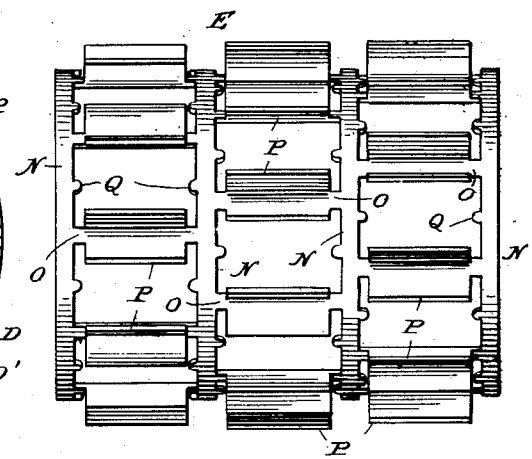

Patented Dec. 15, 1925.

1,565,662

UNITED STATES PATENT OFFICE.

CHARLES I. LOTT, OF NORFOLK, VIRGINIA.

ROLLER BEARING.

Application filed October 7, 1920, Serial No. 415,223. Renewed October 14, 1925.

*To all whom it may concern:*

Be it known that I, CHARLES I. LOTT, a citizen of the United States, and resident of Norfolk, in the county of Norfolk and State of Virginia, have invented certain new and useful Improvements in Roller Bearings, of which the following is a specification, reference being had therein to the accompanying drawing.

The general objects of this invention are to provide a roller bearing, for axles and shafts, that shall be inexpensive, durable, capable of resisting heavy strains, readily repaired, nearly frictionless, remain assembled when removed from its shaft, and that shall have all its rollers alike, or interchangeable. The bearing is of that type in which several sets of rollers spaced as sets and among themselves in each set, move in annular paths about a sleeve against the periphery of which all the rollers rest or bear, and a concentric sleeve which encircles all the rollers and transmits the load which they carry. Preferably the rollers are so arranged that no two align, so that the strains may be distributed among several rollers and on different parts of the sleeves.

In the accompanying drawings,

Fig. 1 is an axial vertical section of the sleeves, the bearing being mounted upon a shaft and having its various parts in working position.

Fig. 2 is a section on the line 2—2, Fig. 1.

Fig. 3 is a plan view of a cage for the rollers.

In these views, A represents an axle or shaft, B a closely fitting sleeve thereon, C a larger concentric sleeve, and D, D', D'' as many annular sets as may be desired, of rollers fitting the annular space between the two sleeves. The sets of rollers are spaced apart by rings F closely fitting but adjustable along the inner sleeve, and the rollers are spaced in each set by a cage E. Near one end of the bearing, the sleeves are provided with annular shoulders having inclined or conical faces G, G', respectively, narrowing the space between the roller receiving sleeves and adapted to receive the end thrust of one terminal set of rollers. All the rollers have in each end central depressions H to receive retaining devices hereinafter mentioned. The sets and the rollers in each set are spaced apart principally by rings F slidable on the inner sleeve, and the rollers in each set by a cage E which holds the rollers in positions such that no two align, whereby the load is advantageously distributed. The rings F have on each side conical faces similar to the faces G, G' above mentioned, and like them receive annular thrusts of the spherically curved marginal portions J of the rollers, the curve merging into the outer cylindrical surface of the roller and with an annular plane surface at its end, in the middle of which is formed a depression H. The outer ends of the rollers of the last or terminal set make contact with conical faces M, M', of rings L, L', respectively. Thus each rounded roller end meets a conical surface at one point only and little friction is developed. The two sleeves form a sort of casing providing a way in which the rollers in use travel around the inner sleeve.

The cage is preferably one rigid structure of soft steel and has rings N lying, usually without contact, between the sets of rollers and in planes cutting the axial lines of the same. These rings are integrally connected by cross bars O from opposite sides of which project outwardly curved wings P, which space the rollers about the inner sleeve, and, between the bars O, have little projections Q which are bent into the depressions H, respectively, to prevent the rollers from moving inwardly and dropping out of the cage when the bearing is removed from the shaft and the inner ring is withdrawn by first removing its ring L.

In assembling, the sleeves are made concentric and placed in registry, longitudinally, one end of the cage is inserted in the annular space between the sleeves, the rollers of the first set are put in place, a ring F is added and followed by a second set of rollers and a second ring, and so on until all are in place, and then the threaded rings L, L' are engaged with the sleeves, respectively.

Any wear is compensated by adjusting the rings last mentioned, the cage, rollers, and rings F moving, when they may, to eliminate looseness.

What I claim is:

1. The combination with a one-piece cylindrical bearing member having at one end an annular projection forming a conical bearing surface, of a concentric sleeve spaced from said member and having an annular projection forming a conical, co-acting bearing surface in the plane of the projection first mentioned, an annular series of cylindrical rollers fitting the space between said surfaces, primarily movable into and out of one end of said space, and terminally diminished to form rounded end surfaces, and a conical ring secured in said end to retain the rollers in place.

2. The combination with two concentric spaced sleeves, of cylindrical rollers arranged in different annular series, fitting the space between the sleeves and each roller terminally diminished to form rounded end faces, and conical-faced rings interposed between the series and at the outer side of each terminal series to prevent endwise movement of the rollers.

3. In a roller bearing, the combination with a cylindrical central load-carrying body, of annular sets of rollers, having rounded ends, arranged to travel around said body, and rings encircling said body between said sets, adjustable along the body, and each presenting conical bearing surfaces to the convex adjacent ends of the rollers.

4. In a roller bearing, the combination with a central, cylindrical, load-carrying body, of annular sets of rollers having rounded ends arranged to travel around the body while carrying a load, loose rings encircling said body between said sets and presenting conical bearing surfaces to the non-axial portion of the corresponding rounded ends, means for resisting outward movement of one terminal set, and threaded devices for positively pushing all the sets and intermediate rings toward said means.

5. In a roller bearing, the combination with a sleeve adapted to fit over a shaft and having near its ends outwardly divergent conical shoulders, of sets of cylindrical rollers having rounded ends arranged to travel around said sleeve between said shoulders, conically faced, circularly and longitudinally adjustable rings between and limiting the mutual approach of said sets, and a cage loosely fitting the spaces between the ends and sides of said rollers near their axial lines and having projections engaging the receding portions of the roller bodies outside their middles, a second sleeve concentric with the first and fitting around all the rollers, and means carried by the cage for resisting material radial displacement of the rollers.

In testimony whereof I hereunto affix my signature.

CHARLES I. LOTT.